US012040970B2

(12) United States Patent
Wang et al.

(10) Patent No.: US 12,040,970 B2
(45) Date of Patent: Jul. 16, 2024

(54) METHOD AND APPARATUS FOR COLLECTING BIT ERROR INFORMATION

(71) Applicant: HUAWEI TECHNOLOGIES CO., LTD., Shenzhen (CN)

(72) Inventors: Yali Wang, Beijing (CN); Fan Yang, Shenzhen (CN); Tianran Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/332,438

(22) Filed: Jun. 9, 2023

(65) Prior Publication Data

US 2023/0344752 A1    Oct. 26, 2023

Related U.S. Application Data

(63) Continuation of application No. PCT/CN2021/131102, filed on Nov. 17, 2021.

(30) Foreign Application Priority Data

Dec. 11, 2020  (CN) .......................... 202011463838.6
Jan. 25, 2021  (CN) .......................... 202110098933.9

(51) Int. Cl.
*H04L 45/28* (2022.01)
*H04L 45/00* (2022.01)
*H04L 45/42* (2022.01)

(52) U.S. Cl.
CPC .............. *H04L 45/28* (2013.01); *H04L 45/42* (2013.01); *H04L 45/566* (2013.01)

(58) Field of Classification Search
CPC ........ H04L 45/28; H04L 45/42; H04L 45/566
See application file for complete search history.

(56) References Cited

U.S. PATENT DOCUMENTS

| 2004/0044764 A1 | 3/2004 | Padmanabhan et al. |
| 2007/0162825 A1* | 7/2007 | Wang .................... G06F 3/0619 |
| | | 714/763 |

(Continued)

FOREIGN PATENT DOCUMENTS

| CN | 110581774 A | 12/2019 |
| CN | 110971445 A | 4/2020 |

(Continued)

OTHER PUBLICATIONS

F. Brockners, Ed. et al, Data Fields for In-situ OAM draft-ietf-ippm-ioam-data-10, ippm Internet-Draft, Jul. 13, 2020, 87 pages.

(Continued)

*Primary Examiner* — Joe Chacko
(74) *Attorney, Agent, or Firm* — Jinghua Karen Tang

(57) ABSTRACT

A method for collecting bit error information is provided. According to the method, a head node may encapsulate indication information into an IPv6 extension header of an IPv6 measurement request packet. The indication information indicates at least one intermediate node on a transmission path of the IPv6 measurement request packet to record bit error information into the IPv6 extension header. According to the application, the bit error information of the intermediate node on the transmission path can be collected.

21 Claims, 7 Drawing Sheets

A BFD packet carries bit error information of a node E

(56) References Cited

U.S. PATENT DOCUMENTS

| | | | |
|---|---|---|---|
| 2017/0324659 A1* | 11/2017 | Liu | H04L 43/10 |
| 2019/0260657 A1* | 8/2019 | Filsfils | H04L 41/5009 |
| 2019/0289481 A1* | 9/2019 | Qvarfordt | H04W 24/08 |
| 2021/0160182 A1* | 5/2021 | Hu | H04L 45/24 |
| 2022/0103312 A1* | 3/2022 | Xin | H04L 47/33 |

FOREIGN PATENT DOCUMENTS

| | | |
|---|---|---|
| CN | 110995583 A | 4/2020 |
| WO | 2016106482 A1 | 7/2016 |

OTHER PUBLICATIONS

H. Song et al, In-situ OAM Direct Exporting, draft-ietf-ippm-ioam-direct-export-01, IPPM Internet-Draft, Aug. 5, 2020, 9 pages.

G. Mirsky et al, Simple Two-way Active Measurement Protocol Optional Extensions, draft-ietf-ippm-stamp-option-tlv-09, Network Working Group Internet-Draft, Aug. 21, 2020, 63 pages.

Request for Comments: 5357, K. Hedayat et al, A Two-Way Active Measurement Protocol (TWAMP), Network Working Group, Oct. 2008, 26 pages.

Request for Comments: 7799, A. Morton et al, Active and Passive Metrics and Methods (with Hybrid Types In-Between), Internet Engineering Task Force (IETF), May 2016, 14 pages.

Request for Comments: 8200, S. Deering et al, Internet Protocol, Version 6 (IPv6) Specification, Internet Engineering Task Force (IETF), Jul. 2017, 42 pages.

RFC 8754, C. Filsfils, Ed. et al, IPv6 Segment Routing Header (SRH), Internet Engineering Task Force (IETF), Mar. 2020, 27 pages.

RFC 8762, G. Mirsky et al, Simple Two-Way Active Measurement Protocol, Internet Engineering Task Force (IETF), Mar. 2020, 15 pages.

Lapukhov Facebook R Chang Barefoot Networks P:"Data-plane probe for in-band telemetry collection; draft-lapukhov-dataplane-probe-01.txt", data-plane probe for in-band telemetry collection; draft-lapukhov-dataplane-probe-01.txt, Internet Engineering Task Force, IETF; Standardworkingdraft, Internet Society (ISOC) 4, Rue Des Falaises CH-1205 Geneva, Switzerland, Jun. 10, 2016 (Jun. 10, 2016), pp. 1-14, XP015113473.

\* cited by examiner

A BFD packet carries bit error information of a node E

METHOD AND APPARATUS FOR COLLECTING BIT ERROR INFORMATION

CROSS-REFERENCE TO RELATED APPLICATIONS

This application is a continuation of International Application No. PCT/CN2021/131102, filed on Nov. 17, 2021, which claims priority to Chinese Patent Application No. 202011463838.6, filed on Dec. 11, 2020 and Chinese Patent Application No. 202110098933.9, filed on Jan. 25, 2021. All of the aforementioned patent applications are hereby incorporated by reference in their entireties.

TECHNICAL FIELD

Embodiments of this application relate to the field of communication technologies, and in particular, to a method and an apparatus for collecting bit error information.

BACKGROUND

At present, in an Internet Protocol (IP) such as Internet Protocol version 6 (IPv6) network, the bidirectional forwarding detection (BFD) protocol may be used for detecting a bit error. In an example, a tail node may send, when determining that its own bit error rate is higher than a specific threshold, bit error information, such as the bit error rate, to a head node by using a BFD packet. After receiving the BFD packet, the head node may trigger path switching.

However, because the BFD packet is a user datagram protocol (UDP) packet, an intermediate node cannot encapsulate the bit error information. As a result, bit error information of an intermediate node on a transmission path cannot be obtained in the solution of transmitting bit error information by using a BFD packet. Consequently, path switching cannot be performed based on the bit error information of the intermediate node, and quality of service (QoS) is affected.

SUMMARY

Embodiments of this application provide a method for collecting bit error information, to collect bit error information of an intermediate node on a transmission path.

According to a first aspect, an embodiment of this application provides a method for collecting bit error information. The method may be performed by a communication apparatus. The communication apparatus may correspond to a first intermediate node on a transmission path. In an example, the communication apparatus may receive a first IPv6 measurement request packet from an upstream node. After receiving the first IPv6 measurement request packet, the communication apparatus may record bit error information of the first intermediate node into an IPv6 extension header of the first IPv6 measurement request packet, to obtain a second IPv6 measurement request packet including the bit error information of the first intermediate node. After obtaining the second IPv6 measurement request packet, the communication apparatus may forward the second IPv6 measurement request packet. It can be learned that, by using this solution, the bit error information of the first intermediate node on a transmission path of the IPv6 measurement request packets may be collected. In an example, after collecting the bit error information of the first intermediate node, a head node may further perform path switching based on the bit error information of the first intermediate node, to improve QoS.

In an implementation, the first IPv6 measurement request packet may include bit error information of at least one intermediate node on the transmission path of the first IPv6 measurement request packet. For example, if the communication apparatus that performs the method for collecting bit error information receives the first IPv6 measurement request packet from the upstream node, and the upstream node of the communication apparatus includes a second intermediate node, the first IPv6 measurement request packet further includes bit error information of the second intermediate node. In this case, in addition to including the bit error information of the first intermediate node, the first IPv6 measurement request packet may further include the bit error information of the second intermediate node.

In an implementation, the IPv6 extension header of the first IPv6 measurement request packet includes first indication information, and the first indication information indicates the first intermediate node to record the bit error information into the first IPv6 measurement request packet. In this case, after receiving the first IPv6 measurement request packet, the communication apparatus corresponding to the first intermediate node may parse the first IPv6 measurement request packet to obtain the first indication information, and then, record the bit error information of the first intermediate node into the IPv6 extension header of the first IPv6 measurement request packet based on an indication of the first indication information. In this manner, the bit error information of the first intermediate node can be collected. In some embodiments, the first indication information may indicate at least one intermediate node on the transmission path to record bit error information into the first IPv6 measurement request packet. The at least one intermediate node includes the first intermediate node. If the first IPv6 measurement request packet further includes bit error information of a second intermediate node, the at least one intermediate node may further include the second intermediate node.

In an implementation, the IPv6 extension header of the first IPv6 measurement request packet may be extended. A first TLV field may be extended, and the first indication information is carried by using the first TLV field.

In an implementation, a type field of a first TLV field may be used to carry the first indication information, and a value field of the first TLV field may be used to record bit error information of the foregoing at least one intermediate node. For example, the bit error information of the first intermediate node is carried by using the value field of the first TLV field. For another example, the bit error information of the first intermediate node and the bit error information of the second intermediate node are carried by using the value field of the first TLV field. In this manner, only one TLV may be extended to implement functions of the first indication information and recording the bit error information of the foregoing at least one intermediate node.

In an implementation, the first IPv6 measurement request packet and the second IPv6 measurement request packet are SRv6 measurement request packets. For example, when the first intermediate node supports SRv6 forwarding, the first IPv6 measurement request packet and the second IPv6 measurement request packet are SRv6 measurement request packets. When the first IPv6 measurement request packet and the second IPv6 measurement request packet are SRv6 measurement request packets, both the first IPv6 measurement request packet and the second IPv6 measurement request packet include an SRH.

In an implementation, the IPv6 extension header that carries the bit error information of the first intermediate node may be an HBH option header. In another implementation, when the first IPv6 measurement request packet is an SRv6 measurement request packet, the IPv6 extension header that carries the bit error information of the first intermediate node may be an SRH or a DOH.

In an implementation, if the first IPv6 measurement request packet is an SRv6 packet, an SRH of the first IPv6 measurement request packet may include an SID corresponding to the first intermediate node. In this case, when the first intermediate node receives the first IPv6 measurement request packet, the segment identifier SID of the first intermediate node in the SRH of the first IPv6 measurement request packet may no longer guide forwarding of the first IPv6 measurement request packet. Therefore, the bit error information of the first intermediate node may be recorded into the SID corresponding to the first intermediate node. In other words, the segment identifier SID of the first intermediate node records the bit error information of the first intermediate node. In this manner, no new field needs to be extended to carry the bit error information of the first intermediate node.

In an implementation, for the SID corresponding to the first intermediate node, the SID of the first intermediate node may include three fields: locator, function, and arguments. Both the function and arguments fields carry behaviors corresponding to locator. Currently, the arguments field of the SID is not clearly defined. Therefore, for the first intermediate node, the bit error information of the first intermediate node may be recorded into the arguments field of the SID of the first intermediate node. In other words, the argument field of the segment identifier SID of the first intermediate node records the bit error information of the first intermediate node. In this manner, on the one hand, no new field needs to be extended to carry the bit error information of the first node, and on the other hand, path information carried in the SRH of the first IPv6 measurement request packet may be retained.

In an implementation, when the first IPv6 measurement request packet is an SRv6 packet, to avoid extending a structure of the SRv6 packet, because it is considered that a flags field in the SRH is not completely allocated, the first indication information may be carried by using the flags field in the SRH of the SRv6 packet, and the bit error information of the at least one intermediate node is recorded by using a segment identifier SID corresponding to the at least one intermediate node.

In an implementation, in addition to the first indication information, the first IPv6 measurement request packet may further include second indication information. The second indication information indicates a tail node on the transmission path of the first IPv6 measurement request packet to include the bit error information of the at least one intermediate node on the transmission path in a measurement response packet. In other words, the tail node may send the bit error information of the at least one intermediate node to the head node on the transmission path based on the second indication information. In this manner, the head node may collect the bit error information of the at least one intermediate node, and may further perform path switching based on the bit error information of the at least one intermediate node, to improve quality of service. The at least one intermediate node mentioned herein includes the foregoing first intermediate node.

In an implementation, the second indication information may be carried in a payload of the first IPv6 measurement request packet. It may be understood that, for an IPv6 measurement request packet received by the tail node, the tail node needs to parse a payload of the IPv6 measurement request packet. Therefore, in the manner of including the second indication information in the payload, there is no extra resource consumption caused parsing the received IPv6 measurement request packet by the tail node.

In an implementation, considering that a STAMP request packet and an IPv6 ping request packet support extension, the payload of the first IPv6 measurement request packet may include, for example, a STAMP request packet or an IPv6 ping request packet, to facilitate using the payload of the first IPv6 measurement request packet to carry the second indication information.

In an implementation, the second indication information and the first indication information may be same indication information. In this case, the first indication information not only can indicate the at least one intermediate node on the transmission path to record the bit error information into the IPv6 extension header of the first IPv6 measurement request packet, but also can indicate the tail node on the transmission path of the first IPv6 measurement request packet to include the bit error information of the at least one intermediate node on the transmission path in a response packet for the first IPv6 measurement request packet. In this manner, the payload of the first IPv6 measurement request packet does not need to be extended.

According to a second aspect, an embodiment of this application provides a method for collecting bit error information. The method may be performed by a communication apparatus. The communication apparatus may correspond to a tail node on a transmission path. In an example, the communication apparatus may receive an IPv6 measurement request packet. An IPv6 extension header of the IPv6 measurement request packet records bit error information of at least one intermediate node on a transmission path of the IPv6 measurement request packet. After receiving the IPv6 measurement request packet, the communication apparatus may send an IPv6 measurement response packet to a head node on the transmission path. The IPv6 measurement response packet includes the bit error information of the at least one intermediate node. It can be learned that, by using this solution, the tail node on the transmission path may send the bit error information of the at least one intermediate node to the head node. In other words, the head node may collect the bit error information of the at least one intermediate node. Further, after collecting the bit error information of the intermediate node, the head node may further perform path switching based on the bit error information of the intermediate node, to improve QoS.

In an implementation, the bit error information of the at least one intermediate node may be carried in a payload of the IPv6 measurement response packet. In this manner, the head node on the transmission path may obtain the bit error information of the at least one intermediate node from the payload of the IPv6 measurement response packet, to further perform path switching based on the bit error information of the intermediate node, thereby improving QoS.

In an implementation, the payload of the IPv6 measurement response packet may be extended, and one TLV field is extended to carry the bit error information of the at least one intermediate node.

In an implementation, if the IPv6 measurement request packet includes a STAMP request packet, the IPv6 measurement response packet includes a STAMP response packet.

The STAMP response packet is used as the payload of the IPv6 measurement response packet. In this case, the STAMP response packet may be extended, and one TLV field is extended to carry the bit error information of the at least one intermediate node.

In an implementation, if the IPv6 measurement request packet includes an IPv6 ping request packet, the IPv6 measurement response packet includes an IPv6 ping response packet. The IPv6 ping response packet is used as the payload of the IPv6 measurement response packet. In this case, the IPv6 ping response packet may be extended, and one TLV field is extended to carry the bit error information of the at least one intermediate node.

In an implementation, the bit error information of the at least one intermediate node included in the IPv6 measurement request packet received by the tail node may be carried in a second TLV field in the IPv6 extension header of the IPv6 measurement request packet.

In an implementation, the IPv6 measurement request packet is an SRv6 measurement request packet.

In an implementation, the IPv6 measurement request packet includes indication information, and the indication information indicates a tail node on the transmission path to include the bit error information of the at least one intermediate node in the measurement response packet. In other words, the tail node may send the bit error information of the at least one intermediate node to the head node on the transmission path based on the indication information. In this manner, the head node may collect the bit error information of the at least one intermediate node, and may further perform path switching based on the bit error information of the at least one intermediate node, to improve quality of service. The at least one intermediate node mentioned herein includes the foregoing first intermediate node.

In an implementation, the indication information may be carried in a payload of the IPv6 measurement request packet. It may be understood that, for an IPv6 measurement request packet received by the tail node, the tail node needs to parse a payload of the IPv6 measurement request packet. Therefore, in the manner of including the indication information in the payload, there is no extra resource consumption caused parsing the received IPv6 measurement request packet by the tail node.

In an implementation, in addition to the bit error information of the at least one intermediate node, the IPv6 measurement response packet further includes bit error information of the tail node on the transmission path. In this case, the head node may collect the bit error information of the at least one intermediate node, and may further collect the bit error information of the tail node on the transmission path. Further, the head node may perform path switching based on the bit error information of the tail node and the bit error information of the at least one intermediate node. In this case, when performing path switching, the head node not only refers to the bit error information of the tail node on the transmission path, but also refers to the bit error information of the at least one intermediate node. Therefore, QoS can be effectively improved.

According to a third aspect, an embodiment of this application provides a method for collecting bit error information. The method may be performed by a communication apparatus. The communication apparatus may correspond to a head node or an intermediate node on a transmission path. In an example, the communication apparatus may obtain an IPv6 measurement request packet. An IPv6 extension header of the IPv6 measurement request packet includes first indication information. The first indication information indicates at least one intermediate node on a transmission path of the IPv6 measurement request packet to record bit error information into the IPv6 extension header. After obtaining the IPv6 measurement request packet, the communication apparatus may forward the IPv6 measurement request packet. Because the IPv6 extension header carries the first indication information, after receiving the IPv6 measurement request packet, the intermediate node on the transmission path may parse the IPv6 extension header. Therefore, the intermediate node may record bit error information into the IPv6 extension header of the IPv6 measurement request packet based on the first indication information. It can be learned that, by using this solution, the bit error information of the intermediate node can be collected. In an example, after collecting the bit error information of the intermediate node, the head node may further perform path switching based on the bit error information of the intermediate node, to improve QoS.

In an implementation, the method is performed by the head node on the transmission path. That is, the head node may generate the IPv6 measurement request packet, and collect the bit error information of the intermediate node on the transmission path by encapsulating the first indication information in the IPv6 measurement request packet.

In one implementation, the method is performed by a first intermediate node on the transmission path. In an example, the first intermediate node may receive the IPv6 measurement request packet, and record the bit error information of the first intermediate node into the IPv6 extension header of the IPv6 measurement request packet based on the first indication information in the IPv6 measurement request packet.

In an implementation, the IPv6 extension header of the IPv6 measurement request packet may be extended. A first TLV field may be extended, and the first indication information is carried by using the first TLV field.

In an implementation, a type field of a first TLV field may be used to carry the first indication information, and a value field of the first TLV field may be used to record bit error information of the foregoing at least one intermediate node. For example, the bit error information of the first intermediate node is carried by using the value field of the first TLV field. For another example, the bit error information of the first intermediate node and the bit error information of the second intermediate node are carried by using the value field of the first TLV field. In this manner, only one TLV may be extended to implement functions of the first indication information and recording the bit error information of the foregoing at least one intermediate node.

In an implementation, the IPv6 measurement request packet is an SRv6 measurement request packet. When a first IPv6 measurement request packet is an SRv6 measurement request packet, all the IPv6 measurement request packets include an SRH.

In an implementation, the IPv6 extension header that carries the bit error information of the first intermediate node may be an HBH option header. In another implementation, when the IPv6 measurement request packet is an SRv6 measurement request packet, the IPv6 extension header that carries the first indication information may be an SRH or a DOH.

In an implementation, if the IPv6 measurement request packet is an SRv6 packet, an SRH of the IPv6 measurement request packet may include an SID corresponding to the first intermediate node. In this case, when the first intermediate node receives the IPv6 measurement request packet, the segment identifier SID of the first intermediate node in the SRH of the IPv6 measurement request packet may no longer guide forwarding of the first IPv6 measurement request packet. Therefore, the bit error information of the first intermediate node may be recorded into the SID corresponding to the first intermediate node. In other words, the segment identifier SID of the first intermediate node records the bit error information of the first intermediate node. In this manner, no new field needs to be extended to carry the bit error information of the first node. The first intermediate node is one intermediate node in the at least one intermediate node.

In an implementation, for the SID corresponding to the first intermediate node, the SID of the first intermediate node may include three fields: locator, function, and arguments. Both the function and arguments fields carry behaviors corresponding to locator. Currently, the arguments field of the SID is not clearly defined. Therefore, for the first intermediate node, the bit error information of the first intermediate node may be recorded into the arguments field of the SID of the first intermediate node. In other words, the argument field of the segment identifier SID of the first intermediate node records the bit error information of the first intermediate node. In this manner, on the one hand, no new field needs to be extended to carry the bit error information of the first node, and on the other hand, path information carried in the SRH of the first IPv6 measurement request packet may be retained.

In an implementation, when the IPv6 measurement request packet is an SRv6 packet, to avoid extending a structure of the SRv6 packet, because it is considered that a flags field in the SRH is not completely allocated, the first indication information may be carried by using the flags field in the SRH of the SRv6 packet, and the bit error information of the at least one intermediate node is recorded by using a segment identifier SID corresponding to the at least one intermediate node.

According to a fourth aspect, this application provides a communication apparatus, including: a transceiver unit and a processing unit. The transceiver unit is configured to perform the sending and receiving operations according to the first aspect and any one of the first aspect, and the processing unit is configured to perform an operation other than the sending and receiving operations according to the first aspect and any one of the first aspect. Alternatively, the transceiver unit is configured to perform the sending and receiving operations according to the second aspect and any one of the second aspect, and the processing unit is configured to perform an operation other than the sending and receiving operations according to the second aspect and any one of the second aspect. Alternatively, the transceiver unit is configured to perform the sending and receiving operations according to the third aspect and any one of the third aspect, and the processing unit is configured to perform an operation other than the sending and receiving operations according to the third aspect and any one of the third aspect.

According to a fifth aspect, this application provides a communication apparatus. The communication apparatus includes a memory and a processor. The memory is configured to store program code. The processor is configured to run instructions in the program code, to enable the communication apparatus to perform the method according to the first aspect and any one of the first aspect, or enable the communication apparatus to perform the method according to the second aspect and any one of the second aspect, or enable the communication apparatus to perform the method according to the third aspect and any one of the third aspect.

According to a sixth aspect, this application provides a communication apparatus. The communication apparatus includes a communication interface and a processor. The communication interface is configured to perform the sending and receiving operations according to the first aspect and any one of the first aspect, and the processor is configured to perform an operation other than the sending and receiving operations according to the first aspect and any one of the first aspect. Alternatively, the communication interface is configured to perform the sending and receiving operations according to the second aspect and any one of the second aspect, and the processor is configured to perform an operation other than the sending and receiving operations according to the second aspect and any one of the second aspect. Alternatively, the communication interface is configured to perform the sending and receiving operations according to the third aspect and any one of the third aspect, and the processor is configured to perform an operation other than the sending and receiving operations according to the third aspect and any one of the third aspect.

According to a seventh aspect, this application provides a computer-readable storage medium. The computer-readable storage medium stores instructions. When the instructions are run on a computer, the computer is enabled to perform the method according to the first aspect and any one of the first aspect, or the computer is enabled to perform the method according to the second aspect and any one of the second aspect, or the computer is enabled to perform the method according to the third aspect and any one of the third aspect.

According to an eighth aspect, this application provides a communication system. The communication system includes: at least two of the communication apparatus according to the fourth aspect, the fifth aspect, or the sixth aspect and performing the method according to the first aspect and any one of the first aspect, the communication apparatus according to the fourth aspect, the fifth aspect, or the sixth aspect and performing the method according to the second aspect and any one of the second aspect, and the communication apparatus according to the fourth aspect, the fifth aspect, or the sixth aspect and performing the method according to the third aspect and any one of the third aspect.

BRIEF DESCRIPTION OF DRAWINGS

To describe the technical solutions in embodiments of this application or in a conventional technology more clearly, the following briefly describes the accompanying drawings used to describe embodiments or the conventional technology. It is clear that the accompanying drawings in the following descriptions show some embodiments of this application, and a person of ordinary skill in the art may still derive other drawings from these accompanying drawings without creative efforts.

DESCRIPTION OF EMBODIMENTS

Embodiments of this application provide a method for collecting bit error information, to collect bit error information of an intermediate node on a transmission path.

For ease of understanding, bit errors and possible application scenarios of embodiments of this application are described first.

Bit errors refer to errors in some bits in a digital bitstream during optical transmission, and degrade quality of transmitted information.

Common factors causing bit errors are as follows:
(1) Optical power is too low or too high.
(2) Optical power is normal, but dispersion is excessively large.
(3) There is an optical fiber problem such as optical fiber pollution or a connector failure.
(4) There is a device problem. For example, a voltage of a power supply that supplies power to a device fluctuates greatly, or an ambient temperature of the device is high.
(5) An electromagnetic environment around the device is poor.

In a digital communication network, for example, in a packet-switched network, a bit error in transmission of an underlying data stream affects a transmitted packet to cause an error of the transmitted packet. When the error cannot be corrected at a physical layer, an Ethernet frame packet may be discarded, an application layer cannot correctly parse a packet, and a service-level agreement (SLA) of a service may be affected.

Figure 1:
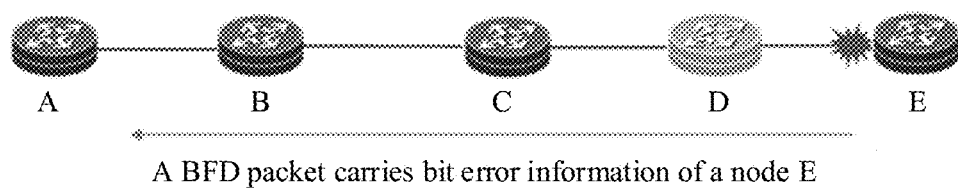
FIG. 1 is a schematic diagram of an example application scenario according to an embodiment of this application.

FIG. 1 is a schematic diagram of an example application scenario.

As shown in FIG. 1, a node A, a node B, a node C, a node D, and a node E are all nodes in an IPv6 network. In an example, a transmission path 1 is node A-node B-node C-node D-node E. In other words, the node A is a head node on the transmission path 1, the node E is a tail node on the transmission path 1, and the node B, the node C, and the node D are all intermediate nodes of the transmission path 1. The packet sent by the head node A may be transmitted to the tail node E sequentially through the node B, the node C, and the node D.

In some examples, some or all nodes on the transmission path 1 may also support the segment routing Internet Protocol version 6 (SRv6).

Currently, the BFD protocol may be used for detecting a bit error. In an example, after an ingress interface of the node E senses a bit error, if a bit error rate on the ingress interface of the node E exceeds a bit error alarm threshold of the ingress interface, the node E considers that a bit error fault occurs on a corresponding link. In this case, the node E may transmit the bit error information to the node A by using a BFD packet, and the node A may trigger path switching based on the received bit error information. In addition, the node E may also trigger path switching based on the bit error information.

The node E may carry the bit error information in a diagnostics (diag) field of the BFD packet. For a structure of the BFD packet and the diag field, refer to related descriptions in Request for comments (RFC) 5880. Details are not described herein. However, because the BFD packet is a UDP packet, the diag field belongs to a payload of the UDP packet. Moreover, for a UDP packet, in a process of transmitting the BFD packet, the intermediate node guides packet forwarding based on an IP header, and does not process a UDP header and a UDP payload. Therefore, in the scenario shown in FIG. 1, when the tail node E transmits the BFD packet to the head node A sequentially through the node D, the node C, and the node B, the node D, the node C, and the node B that serve as intermediate nodes cannot encapsulate bit error information of the node D, the node C, and the node B into the BFD packet. Therefore, the head node A can only obtain bit error information of the tail node E, but cannot obtain bit error information of the node D, the node C, and the node B that serve as intermediate nodes. However, the bit error information of the intermediate nodes can also affect transmission quality of the transmission path 1 to some extent. In other words, if the head node can trigger path switching in time when bit errors on the intermediate nodes are severe, QoS can also be improved to some extent. However, in the foregoing manner of detecting a bit error by using the BFD protocol, because bit error information of the intermediate nodes of the transmission path cannot be obtained, path switching cannot be triggered based on the bit error information of the intermediate node, and correspondingly, QoS is degraded.

In view of this, embodiments of this application provide a method for collecting bit error information. This method is described below with reference to the accompanying drawings.

The communication apparatus mentioned in embodiments of this application may be a network device such as a switch or a router, or may be some components on the network device, for example, a board and a line card on the network device, or may be a functional module on the network device, or may be a chip configured to perform the method according to embodiments of this application. This is not specifically limited in embodiments of this application. Communication apparatuses may be directly connected, for example, by an Ethernet cable or an optical cable, but this application is not limited thereto.

In embodiments of this application, that the communication apparatus corresponds to a node means that the communication apparatus may be the node itself, or may be some components on the node. The node in embodiments of this application may be a network device such as a switch or a router.

The bit error information mentioned in embodiments of this application includes, but is not limited to, information that can represent a bit error status, for example, a bit error rate, a packet loss rate, and a bit error rate exceeding a bit error alarm threshold.

Figure 2:
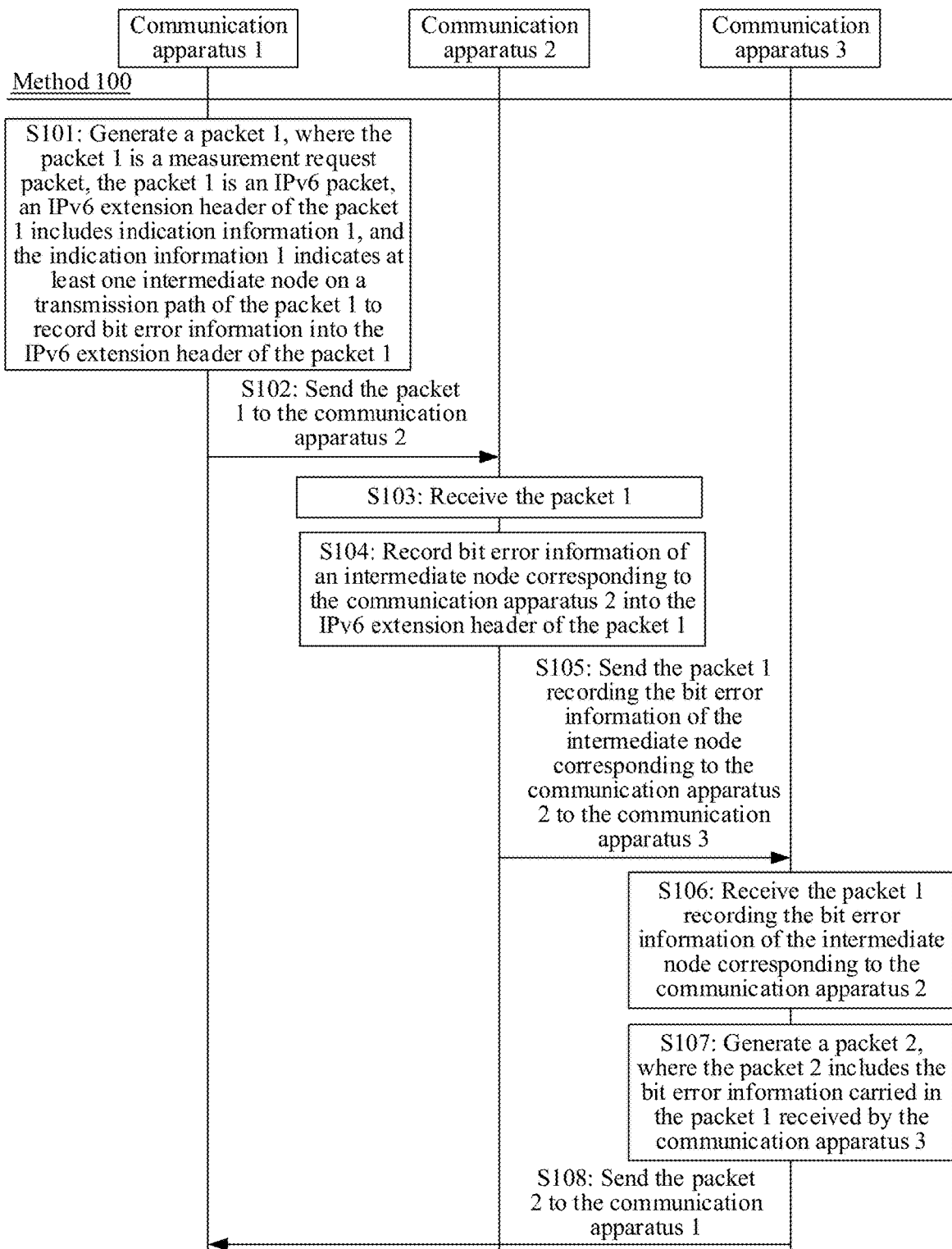
FIG. 2 is a diagram of signaling exchange of a method for collecting bit error information according to an embodiment of this application.

FIG. 2 is a diagram of signaling exchange of a method for collecting bit error information according to an embodiment of this application. A method 100 for collecting bit error information shown in FIG. 2 may be applied, for example, to a scenario shown in FIG. 1. For example, a communication apparatus 1 may correspond to a node A shown in FIG. 1, a communication apparatus 2 may correspond to a node B, a node C, or a node D shown in FIG. 1, and a communication apparatus 3 may correspond to a node E shown in FIG. 1.

The method 100 shown in FIG. 2 may include, for example, the following S101 to S108.

S101: The communication apparatus 1 generates a packet 1, where the packet 1 is an IPv6 measurement request packet, an IPv6 extension header of the packet 1 includes indication information 1, and the indication information 1 indicates at least one intermediate node on a transmission path of the packet 1 to record bit error information into the IPv6 extension header of the packet 1.

In this embodiment of this application, the IPv6 extension header is an extension header that can be parsed by an intermediate node on the transmission path of the packet 1. In an example, the IPv6 extension header may be a hop-by-hop (HBH) option header. In this case, the HBH option header of the packet 1 includes the indication information 1. In another example, if the packet 1 is an SRv6 packet, the IPv6 extension header may be a segment routing header (SRH). In this case, the SRH of the packet 1 includes the indication information 1. In still another example, if the packet 1 is an SRv6 packet, the IPv6 extension header may be a destination option header (DOH). In this case, the DOH of the packet 1 includes the indication information 1. For the packet 1 that carries the DOH, it should be noted that, for a node that receives the packet 1, the node can parse the DOH only when a destination address of the packet 1 is the node itself. In a forwarding process of the SRv6 packet, the destination address may change with the forwarding process. Therefore, the destination address of the SRv6 packet may be an intermediate node on a transmission path of the SRv6 packet. In other words, the intermediate node may parse the DOH in the SRv6 packet. Therefore, when the packet 1 is an SRv6 packet, if the DOH of the packet 1 includes the indication information 1, the intermediate node on the transmission path of the packet 1 may also parse the DOH.

For a format of the IPv6 packet, a format of the HBH option header, and a format of the DOH, refer to related descriptions in RFC 8200. Details are not described herein. For a format of the SRH, refer to related descriptions in RFC 8754. Details are not described herein.

In an implementation of this embodiment of this application, the IPv6 extension header may be extended, and one type-length-value (TLV) field may be extended. For example, a TLV field 1 is extended, and the TLV field 1 is used to carry the indication information 1. In another example, if the packet 1 is an SRv6 packet, and the SRH of the packet 1 includes the indication information 1, because it is considered that a flags field of the SRH is currently not allocated, the indication information 1 may be carried by using the flags field of the SRH.

In this embodiment of this application, the indication information 1 may indicate at least one intermediate node on the transmission path of the packet 1 to record bit error information into the extension header of the packet 1. The at least one intermediate node mentioned herein may include a node corresponding to the communication apparatus 2 mentioned below. It may be understood that, when forwarding the packet 1, the intermediate node parses the foregoing IPv6 extension header that carries the indication information 1. Therefore, when the intermediate node records the bit error information into the IPv6 extension header, no extra resource consumption is caused parsing the packet 1. In an example, a bit error information recording function may be configured for the foregoing at least one intermediate node in advance. An intermediate node on which the bit error information recording function is configured may record bit error information of the intermediate node into the IPv6 extension header of the packet 1 based on the indication information 1.

In an example, the extension header of the packet 1 may be extended. One TLV field is extended, and the TLV field is used to carry the bit error information of the at least one intermediate node. For example, when the foregoing indication information 1 is carried in a TLV field 1, the indication information 1 may be carried in a type field of the TLV field 1, and the bit error information of the at least one intermediate node is recorded in a value field of the TLV field 1. In this manner, only one TLV field may be extended, and the TLV field is used to carry the indication information 1 and record the bit error information of the at least one intermediate node. For another example, one TLV field 2 is extended, and the TLV field 2 is used to carry the bit error information of the at least one intermediate node.

In another example, if the packet 1 is an SRv6 packet, for an intermediate node indicated by the SID list, when the intermediate node receives the SRv6 packet, a segment identifier (SID) of the intermediate node in the SRH of the SRv6 packet may no longer guide forwarding of the SRv6 packet. Therefore, in an example, a segment identifier SID respectively corresponding to the at least one intermediate node records bit error information of the at least one intermediate node. The SID of the intermediate node is in a one-to-one correspondence with the bit error information of the intermediate node. In other words, for the intermediate node 1, the bit error information of the intermediate node 1 may be recorded in the SID of the intermediate node 1.

There may be a plurality of implementations during specific implementation of using a segment identifier SID respectively corresponding to the at least one intermediate node to record the bit error information of the at least one intermediate node. The following describes two possible implementations.

Figure 3A:
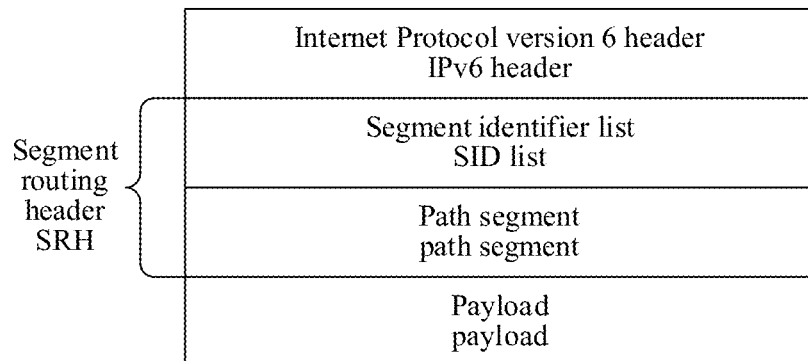
FIG. 3a is a schematic diagram of a structure of an SRv6 packet including a path segment field according to an embodiment of this application.

In an implementation, the SID of the intermediate node 1 may be replaced with the bit error information of the intermediate node 1. In this case, considering that if the SID of the intermediate node 1 is replaced with the bit error information of the intermediate node 1, a packet received by a tail node on the transmission path of the packet 1 no longer includes an SID list that can indicate the transmission path. However, in some scenarios, the tail node needs to use the SID list that can indicate the transmission path. For example, the tail node may need to perform a packet integrity check based on the SID list. In other words, if this solution is used, the tail node may not be able to perform a packet integrity check based on the SID list. However, in some scenarios, for an SRv6 packet, in addition to the SID list, an SRH of the SRv6 packet may further include a path segment field. The path segment field includes 128 bits, and a value of the path segment field identifies an SRv6 path. When the packet 1 includes a path segment field, a value of the path segment field identifies the transmission path of the packet 1. For understanding, refer to FIG. 3a. FIG. 3a is a schematic diagram of a structure of an SRv6 packet including a path segment field according to an embodiment of this application. It may be understood that, for the SRv6 packet shown in FIG. 3a, even if an SID list in an SRH in a packet received by the tail node cannot indicate the transmission path, the path segment field may indicate the transmission path of the SRv6 packet. Therefore, the tail node may determine the transmission path of the SRv6 packet based on the path segment field. In an example, the tail node may determine, based on the path segment field, the SID list that can indicate the transmission path, and further perform a packet integrity check based on the determined SID list. Therefore, in a preferable solution, if the SRH of the packet 1 includes the path segment field, the intermediate node may replace the SID corresponding to the intermediate node with the bit error information of the intermediate node, to record the bit error information by using the SID of the intermediate node. For detailed descriptions of the path segment field, refer to related descriptions of the standard document draft-ietf-spring-srv6-path-segment-00. Details are not described herein.

In addition, it should be noted that, FIG. 3a is merely a schematic diagram. Although not shown in FIG. 3a, in addition to the SID list and the path segment field, the SRH may further include other fields. For the other fields included in the SRH, refer to descriptions in RFC 8754. Details are not described herein.

In another implementation, considering that for a node, an SID of the node includes 128 bits, and the 128 bits may include three fields: locator, function, and arguments. Both the function and arguments fields carry behaviors corresponding to locator. Currently, the arguments field of the SID is not clearly defined. Therefore, for the intermediate node 1, the bit error information of the intermediate node 1 may be recorded into the arguments field of the SID of the intermediate node 1. In this case, the argument field of the segment identifier SID respectively corresponding to the at least one intermediate node carries local bit error information of the at least one intermediate node. The argument field of the SID of the intermediate node is in a one-to-one correspondence with the bit error information of the intermediate node. In this manner, the SRH not only retains the SID list that can indicate the transmission path, but also carries the bit error information of the intermediate node.

In a specific implementation, to avoid extending a structure of the SRv6 packet, the indication information 1 may be carried by using the flags field in the SRH of the SRv6 packet, and the bit error information of the at least one intermediate node is recorded by using a segment identifier SID corresponding to the at least one intermediate node.

In an implementation of this embodiment of this application, in addition to the indication information 1, the packet 1 may further include indication information 2. The indication information 2 indicates the tail node on the transmission path of the packet 1 to include the bit error information of the at least one intermediate node on the transmission path in a response packet for the packet 1.

In an example, the indication information 2 may be carried in a payload of the packet 1. In some embodiments, one TLV field 3 may be extended in the payload of the packet 1, and the TLV field 3 is used to carry the indication information 2. When the extended TLV field 3 is used to carry the indication information 2, an available implementation is using a type field of the TLV field 3 to carry the indication information 2.

In another example, the indication information 2 is similar to the indication information 1, and may also be carried in the IPv6 extension header of the packet 1. In some embodiments, the indication information 2 may be carried in an extended TLV field, for example, carried in a TLV field 4. The IPv6 extension header mentioned herein may be an HBH option header. When the packet 1 is an SRv6 packet, the IPv6 extension header may be an SRH or a DOH. This is not specifically limited in this embodiment of this application. In still another example, the indication information 2 is the foregoing indication information 1. In other words, the indication information 1 can indicate at least one intermediate node on the transmission path of the packet 1 to record bit error information into the IPv6 extension header of the packet 1, and can indicate the tail node on the transmission path of the packet 1 to include the bit error information of the at least one intermediate node on the transmission path in a response packet for the packet 1.

In this application, an IPv6 measurement request packet refers to a packet encapsulated using IPv6, and a payload of the IPv6 measurement request packet carries a measurement request packet. The measurement request packet includes, but is not limited to, a simple two-way active measurement protocol (STAMP) request packet, a ping request packet, or a BFD packet.

Figure 3B:
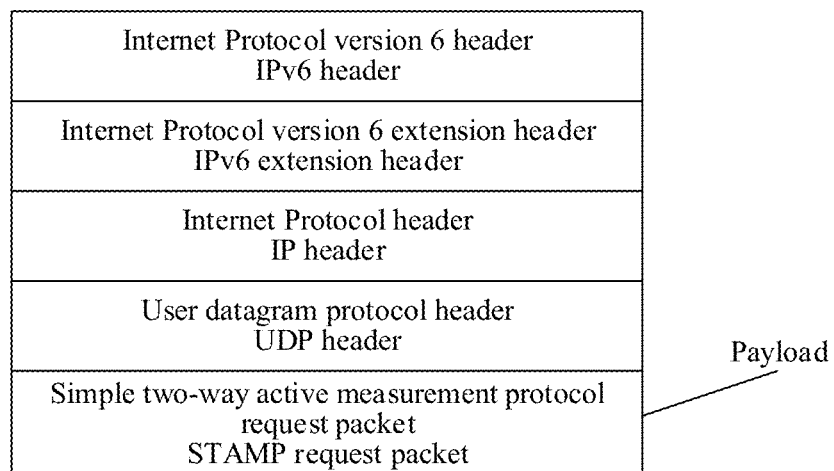
FIG. 3b is a schematic diagram of a structure of an IPv6 packet according to an embodiment of this application.

In an example, the payload of the packet 1 may carry a STAMP request packet. The STAMP request packet may also be referred to as a STAMP session-sender test packet. When the payload of the packet 1 carries the STAMP request packet, for a structure of the packet 1, refer to FIG. 3b. As shown in FIG. 3b, the packet 1 includes an IPv6 header, an IPv6 extension header, an IP header, a UDP header, and the STAMP request packet. The STAMP request packet is used as the payload of packet 1. For a specific structure of the STAMP request packet, refer to related descriptions in RFC 8762. Details are not described herein.

In addition, for the STAMP request packet, it should be noted that, it is described in the Internet Engineering Task Force (IETF) Internet Protocol Performance Metrics (IPPM) working group document draft-ietf-ippm-stamp-option-tiv-09 that the STAMP request packet supports an extended TLV field. In this embodiment of this application, the STAMP request packet carried in the payload of the packet 1 may include an extended TLV field. For example, when the foregoing indication information 2 is carried in the payload of the packet 1, the STAMP request packet may include the extended TLV field 3. The extended TLV field 3 carries the foregoing indication information 2. Certainly, when the indication information 2 is carried in the extension header of the packet 1, the STAMP request packet carried in the payload of the packet 1 may not include an extended TLV field. This is not specifically limited in this embodiment of this application.

Figure 3C:
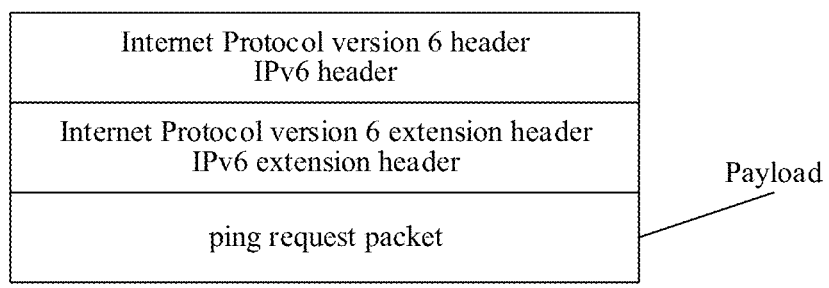
FIG. 3c is a schematic diagram of a structure of an IPv6 packet according to an embodiment of this application.

In another example, the payload of the packet 1 may carry a ping request packet. When the payload of the packet 1 carries the ping request packet, for a structure of the packet 1, refer to FIG. 3c. As shown in FIG. 3c, the packet 1 includes an IPv6 header, an IPv6 extension header, and the ping request packet. The ping request packet is used as the payload of the packet 1. For a specific structure of the ping request packet, refer to related descriptions in RFC 8029 and RFC 792. Details are not described herein. In this embodiment of this application, the ping request packet carried in the payload of the packet 1 may include an extended TLV field. For example, when the foregoing indication information 2 is carried in the payload of the packet 1, the ping request packet may include the extended TLV field 3. The extended TLV field 3 carries the foregoing indication information 2. Certainly, when the indication information 2 is carried in the extension header of the packet 1, the ping request packet carried in the payload of the packet 1 may not include an extended TLV field. This is not specifically limited in this embodiment of this application.

Figure 3D:
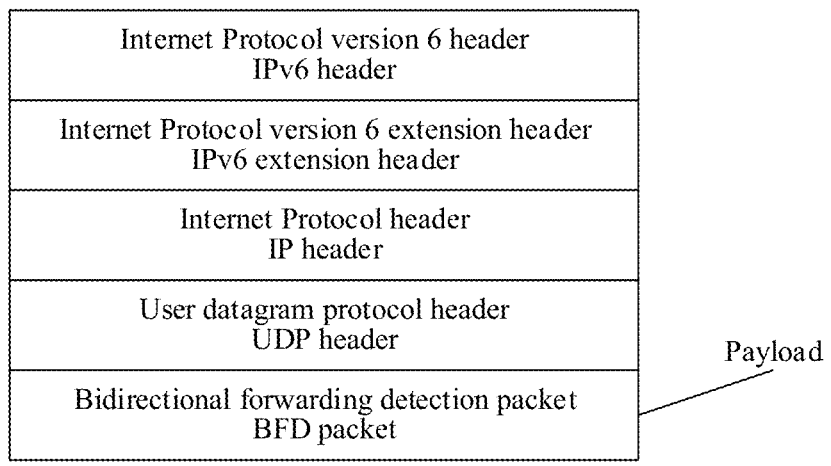
FIG. 3d is a schematic diagram of a structure of an IPv6 packet according to an embodiment of this application.

In still another example, the payload of the packet 1 may carry a BFD packet. When the payload of the packet 1 carries the BFD packet, for a structure of the packet 1, refer to FIG. 3d. As shown in FIG. 3d, the packet 1 includes an IPv6 header, an IPv6 extension header, an IP header, a UDP header, and the BFD packet. The BFD packet is used as the payload of packet 1. For a specific structure of the BFD packet, refer to related descriptions in RFC 5800. Details are not described herein.

S102: The communication apparatus 1 sends the packet 1 to the communication apparatus 2.

S103: The communication apparatus 2 receives the packet 1.

S104: The communication apparatus 2 records bit error information of an intermediate node corresponding to the communication apparatus 2 into the IPv6 extension header of the packet 1.

After generating the packet 1, the communication apparatus 1 may forward the packet 1 to the communication apparatus 2. After receiving the packet 1, the communication apparatus 2 may parse the packet 1. After parsing the packet 1, the communication apparatus 2 may obtain the foregoing indication information 1. After obtaining the indication information 1, the communication apparatus 2 may obtain the bit error information of the intermediate node corresponding to the communication apparatus 2, and include the bit error information of the intermediate node corresponding to the communication apparatus 2 in the IPv6 extension header of the packet 1.

In an implementation, if the IPv6 extension header of the packet 1 includes a TLV field 1, and a type field of the TLV field 1 carries the indication information 1, a value field of the TLV field 1 carries bit error information of the at least one intermediate node. In this case, the communication apparatus 2 may record the bit error information of the intermediate node corresponding to the communication apparatus 2, for example, an intermediate node 2, into the value field of the TLV field 1.

In another implementation, if the extension header of the packet 1 includes a TLV field 2, the TLV field 2 carries the bit error information of the at least one intermediate node. In this case, the communication apparatus 2 may record the bit error information of the intermediate node 2 into the TLV field 2.

In still another implementation, if the packet 1 is an SRv6 packet, and the communication apparatus 2 corresponds to a node that supports SRv6 forwarding, the communication apparatus 2 may record the bit error information of the intermediate node 2 into an SID corresponding to the intermediate node 2. For example, the communication apparatus 2 replaces the SID corresponding to the intermediate node 2 with the bit error information of the intermediate node 2. For another example, the communication apparatus 2 records the bit error information of the intermediate node 2 into an arguments field of the SID corresponding to the intermediate node 2.

S105: The communication apparatus 2 sends the packet 1 recording the bit error information of the intermediate node corresponding to the communication apparatus 2 to the communication apparatus 3.

S106: The communication apparatus 3 receives the packet 1 recording the bit error information of the intermediate node corresponding to the communication apparatus 2.

After recording the bit error information of the intermediate node 2 into the IPv6 extension header of the packet 1, the communication apparatus 2 may send the packet 1 recording the bit error information of the intermediate node 2 to the communication apparatus 3. The packet received by the communication apparatus 3 includes bit error information of at least one intermediate node on the transmission path, and the bit error information of the at least one intermediate node includes at least the bit error information of the intermediate node 2. In other words, if another intermediate node, other than the intermediate node corresponding to the communication apparatus 2, in intermediate nodes of the transmission path also has the bit error information recording function, a packet received by the communication apparatus 3 further includes bit error information of the another intermediate node.

An example in which the method 100 is applied to the scenario shown in FIG. 1 is used for description.

When the method 100 is applied to the scenario shown in FIG. 1, for example, the communication apparatus 1 may correspond to the node A shown in FIG. 1, the communication apparatus 2 may correspond to the node B, the node C, or the node D shown in FIG. 1, and the communication apparatus 3 may correspond to the node E shown in FIG. 1. It is assumed that the node B, the node C, and the node D all have a bit error information recording function.

When the communication apparatus 2 corresponds to the node B shown in FIG. 1, the communication apparatus 2 may send a packet 1 recording bit error information of the node B to the communication apparatus 3 sequentially through the node C and the node D. In this case, when receiving the packet sent by the communication apparatus 2, the node C and the node D may respectively add their own bit error information to the received packet. In this case, in addition to the bit error information of the node B (the communication apparatus 2), the packet received by the communication apparatus 3 further includes bit error information of the node C and the node D.

When the communication apparatus 2 corresponds to the node C shown in FIG. 1, the communication apparatus 1 may send the packet 1 to the communication apparatus 2 through the node B. When receiving the packet 1 sent by the communication apparatus 1, the node B may add its own bit error information to the received packet. In other words, in addition to the foregoing indication information 1, the packet 1 received by the communication apparatus 2 further includes the bit error information of the node B. That is, the packet 1 received by the communication apparatus 2 further includes the bit error information of an upstream node (the node B) of the node corresponding to the communication apparatus 2. Correspondingly, after adding its own bit error information to the received packet 1, the communication apparatus 2 may send, through the node D, the packet 1 recording the bit error information of the node C to the communication apparatus 3. When receiving the packet sent by the communication apparatus 2, the node D may add its own bit error information to the received packet. In this case, in addition to the bit error information of the node C (the communication apparatus 2), the packet received by the communication apparatus 3 further includes bit error information of the node B and the node D.

When the communication apparatus 2 corresponds to the node D shown in FIG. 1, the communication apparatus 1 may send the packet 1 to the communication apparatus 2 through the node B and the node C. When receiving the packet 1 sent by the communication apparatus 1, the node B and the node C may add their own bit error information to the received packet. In other words, in addition to the foregoing indication information 1, the packet 1 received by the communication apparatus 2 further includes the bit error information of the node B and the node C. That is, the packet 1 received by the communication apparatus 2 further includes the bit error information of upstream nodes (the node B and the node C) of the node corresponding to the communication apparatus 2. Correspondingly, after adding its own bit error information to the received packet 1, the communication apparatus 2 may send directly send the packet 1 recording the bit error information of the node D to the communication apparatus 3. In this case, in addition to the bit error information of the node D (the communication apparatus 2), the packet received by the communication apparatus 3 further includes bit error information of the node B and the node C.

S107: The communication apparatus 3 generates a packet 2, where the packet 2 includes the bit error information carried in the packet 1 received by the communication apparatus 3

After receiving the packet 1 that is sent by the communication apparatus 2 and that carries the bit error information of the at least one intermediate node, the communication apparatus 3 may parse the packet 1 received by the communication apparatus 3. As can be learned from the foregoing, the packet 1 received by the communication apparatus 3 includes the indication information 2, and the indication information 2 indicates the communication apparatus 3 to include the bit error information of the at least one intermediate node on the transmission path in a response packet for the packet 1. In this case, the communication apparatus 3 may extract the bit error information carried in the received packet 1, and generate the packet 2 based on the bit error information carried in the received packet 1. The packet 2 includes the bit error information carried in the received packet 1, that is, the packet 2 includes the bit error information of the at least one intermediate node on the transmission path. The packet 2 mentioned herein is a response packet for the packet 1, and the packet 2 is also an IPv6 packet. The packet 2 may also be referred to as an IPv6 measurement response packet. The IPv6 measurement response packet refers to a packet encapsulated based on IPv6, and a payload of the IPv6 measurement response packet carries a measurement response packet. The measurement response packet includes, but is not limited to, a STAMP response packet, a ping response packet, or a BFD packet.

In an example, in addition to the bit error information of the at least one intermediate node, the packet 2 generated by the communication apparatus 3 may further include bit error information of the tail node on the transmission path. In this manner, not only the bit error information of the intermediate node on the transmission path can be collected, but also the bit error information of the tail node on the transmission path can be collected.

It should be noted that, in an example, the communication apparatus 3 may perform, based on the indication information 1 in the packet 1 received by the communication apparatus 3, the step of obtaining the packet 2 including bit error information of the tail node. In other words, in addition to indicating the at least one intermediate node on the transmission path of the packet 1 to record the bit error information into the packet 1, the indication information 1 may further indicate the tail node on the transmission path to include the bit error information of the tail node in the response packet.

In another example, the communication apparatus 3 may perform, based on the indication information 2 in the packet 1 received by the communication apparatus 3, the step of obtaining the packet 2 including bit error information of the tail node. In other words, in addition to indicating the tail node on the transmission path to include the bit error information of the at least one intermediate node in the response packet, the foregoing indication information 2 may further indicate the tail node on the transmission path to include the bit error information of the tail node in the response packet.

In still another example, if the packet 1 received by the communication apparatus 3 is a BFD packet, the communication apparatus 3 may directly perform, based on the BFD packet, the step of obtaining the packet 2 including bit error information of the tail node.

In an example, the communication apparatus 3 may include the bit error information of the at least one intermediate node in an extended TLV field of the packet 2. Correspondingly, if the packet 2 further includes the bit error information of the tail node, the communication apparatus 3 may include the bit error information of the tail node and the bit error information of the at least one intermediate node in the extended TLV field of the packet 2.

Figure 3E:
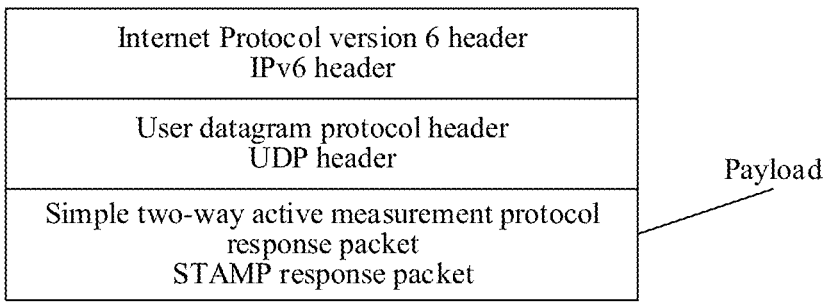
FIG. 3e is a schematic diagram of a structure of an IPv6 packet according to an embodiment of this application.

In another example, the communication apparatus 3 may include the bit error information of the at least one intermediate node in a payload of the packet 2. For example, when the packet 1 includes a STAMP request packet, the packet 2 may include a STAMP response packet. In this case, for a structure of the packet 2, refer to FIG. 3*e*. As shown in FIG. 3*e*, the packet 2 includes an IPv6 header, a UDP header, and the STAMP response packet, where the STAMP response packet is used as the payload of the packet 2. For a specific structure of the STAMP response packet, refer to related descriptions in RFC 8762. Details are not described herein. In this case, the bit error information of the at least one intermediate node may be carried in the STAMP response packet in the payload of the packet 2. Because it is described in the IETF IPPM working group document draft-ietf-ippm-stamp-option-tiv-09 that a STAMP response packet supports an extended TLV field, in an example, the STAMP response packet in the payload of the packet 2 may be extended, and one TLV field is extended to carry the bit error information of the at least one intermediate node. The STAMP response packet may also be referred to as a STAMP session-reflector test packet. For another example, when the packet 1 includes a ping request packet, the packet 2 may include a ping response packet. In this case, the bit error information of the at least one intermediate node may be carried in the ping response packet in the payload of the packet 2. In an example, the ping response packet in the payload of the packet 2 may be extended, and one TLV field is extended to carry the bit error information of the at least one intermediate node.

Correspondingly, if the packet 2 further includes the bit error information of the tail node, the communication apparatus 3 may include the bit error information of the tail node and the bit error information of the at least one intermediate node in the payload of the packet 2. For example, when the packet 1 includes a STAMP request packet, the packet 2 includes a STAMP response packet. In this case, the STAMP response packet in the payload of the packet 2 may be extended, and one TLV field is extended to carry the bit error information of the tail node and the bit error information of the at least one intermediate node. For another example, when the packet 1 includes a ping request packet, the packet 2 includes a ping response packet. In this case, the bit error information of the tail node and the bit error information of the at least one intermediate node may be carried in the ping response packet in the payload of the packet 2. In an example, the ping response packet in the payload of the packet 2 may be extended, and one TLV field is extended to carry the bit error information of the tail node and the bit error information of the at least one intermediate node.

In another example, the communication apparatus 3 may include the bit error information of the at least one intermediate node in an extension header of the packet 2. For example, one TLV field is extended in the extension header of the packet 2, and the TLV field is used to carry the bit error information of the at least one intermediate node. The extension header mentioned herein may be any one of an HBH option header, a DOH, and an SRH. In this case, content included in the payload of the packet 2 is not specifically limited in this embodiment of this application. For example, when the packet 1 includes a STAMP request packet, the payload of the packet 2 may include a STAMP response packet. The response packet is for implementing another performance detection function, for example, implementing delay detection on the transmission path. For another example, when the packet 1 includes a ping request packet, a payload of the packet 2 includes a ping response packet, and the ping response packet is for implementing connectivity detection on the transmission path, and so on.

Correspondingly, if the packet 2 further includes the bit error information of the tail node, the communication apparatus 3 may include the bit error information of the tail node and the bit error information of the at least one intermediate node in the extension header of the packet 2. For example, one TLV field is extended in the extension header of the packet 2, and the TLV field is used to carry the bit error information of the tail node and the bit error information of the at least one intermediate node. The extension header mentioned herein may be any one of an HBH option header, a DOH, and an SRH.

S108: The communication apparatus 3 sends the packet 2 to the communication apparatus 1.

After generating the packet 2, the communication apparatus 3 may forward the packet 2 to the communication apparatus 1. After receiving the packet 2, the communication apparatus 1 may parse the packet 2, to obtain the bit error information of the at least one intermediate node on the transmission path. Further, the communication apparatus 1 may perform path switching based on the bit error information of the at least one intermediate node on the transmission path. Because the communication apparatus 1 refers to the bit error information of the at least one intermediate node when performing path switching, QoS can be effectively improved by using the foregoing method 100.

Correspondingly, when the packet 2 further includes the bit error information of the tail node, the communication apparatus 1 may further collect the bit error information of the tail node. Further, the communication apparatus 1 may perform path switching based on the bit error information of the tail node and the bit error information of the at least one intermediate node on the transmission path. In this case, when performing path switching, the communication apparatus 1 not only refers to the bit error information of the tail node on the transmission path, but also refers to the bit error information of the at least one intermediate node. Therefore, QoS can be effectively improved by using the foregoing method 100.

Figure 4:
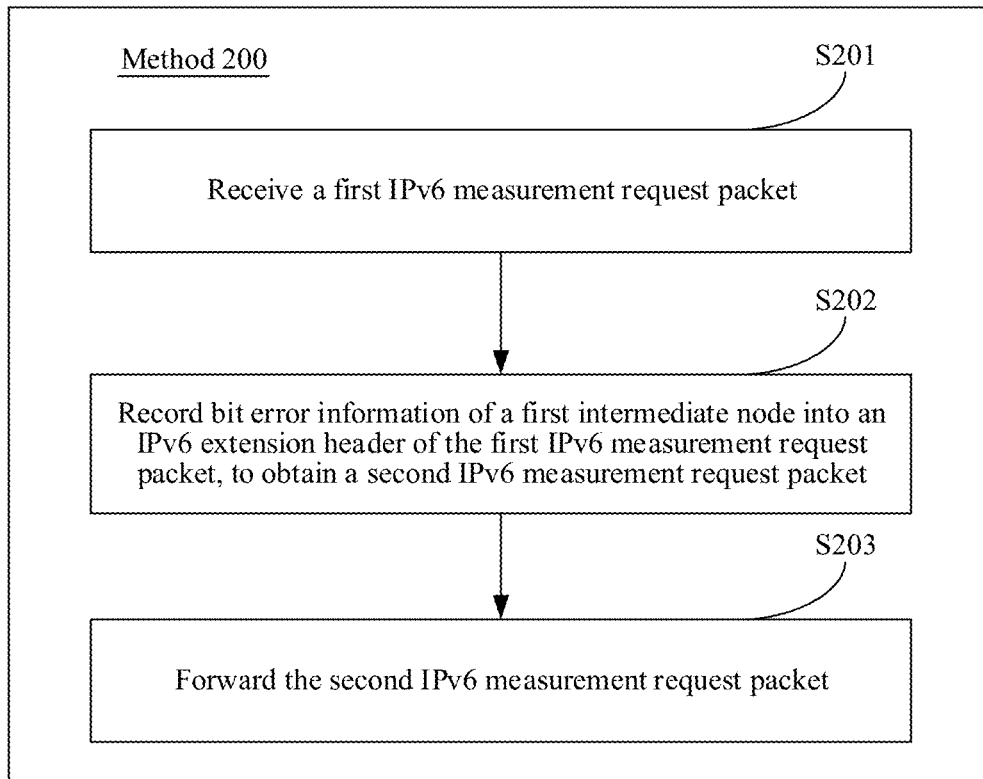
FIG. 4 is a schematic flowchart of a method for collecting bit error information according to an embodiment of this application.

Embodiments of this application further provide a method for collecting bit error information. FIG. 4 is a schematic flowchart of a method for collecting bit error information according to an embodiment of this application. A method 200 for collecting bit error information shown in FIG. 4 may be performed by an intermediate node on a transmission path. The intermediate node may correspond to the intermediate node corresponding to the communication apparatus 2 in the foregoing method 100. In other words, when the method 200 is applied to the foregoing method 100, the method 200 may correspond to the steps performed by the communication apparatus 2 in the foregoing method 100. The method 200 may include, for example, the following S201 to S203.

S201: Receive a first IPv6 measurement request packet.

S202: Record bit error information of a first intermediate node into an IPv6 extension header of the first IPv6 measurement request packet, to obtain a second IPv6 measurement request packet.

S203: Forward the second IPv6 measurement request packet.

The first IPv6 measurement request packet mentioned herein may correspond to the packet 1 in the method 100. The first intermediate node mentioned herein may correspond to the intermediate node corresponding to the communication apparatus 2 in the method 100. The second IPv6 measurement request packet mentioned herein may correspond to the packet 1 recording the bit error information of the intermediate node corresponding to the communication apparatus 2 in the method 100.

In an implementation, the first IPv6 measurement request packet further includes bit error information of a second intermediate node, and the second intermediate node is an upstream node of the first intermediate node.

In an example, when the first intermediate node corresponds to the node C shown in FIG. 1, the second intermediate node may correspond to the node B shown in FIG. 1. When the first intermediate node corresponds to the node D shown in FIG. 1, the second intermediate node may correspond to the node B or the node C shown in FIG. 1.

In an implementation, the IPv6 extension header includes first indication information, and the first indication information indicates the first intermediate node to record the bit error information into the first IPv6 measurement request packet.

The first indication information mentioned herein may correspond to the indication information 1 in the method 100.

In an implementation, the IPv6 extension header includes a first type-length-value TLV field, and the first TLV field includes the first indication information.

The first TLV field mentioned herein may correspond to the TLV field 1 in the method 100.

In an implementation, a type field of the first TLV field includes the first indication information, and a value field of the first TLV field records the bit error information of the first intermediate node.

In an implementation, the first IPv6 measurement request packet and the second IPv6 measurement request packet are SRv6 measurement request packets.

In an implementation, a segment identifier SID of the first intermediate node records the bit error information of the first intermediate node. In this case, the foregoing IPv6 extension header including the indication information 1 may be an SRH.

In an implementation, an argument field of the segment identifier SID records the bit error information of the first intermediate node.

In an implementation, the IPv6 extension header is a hop-by-hop HBH option header.

In an implementation, the IPv6 extension header is a destination option header DOH.

In an implementation, the first IPv6 measurement request packet further includes second indication information, the second indication information indicates a tail node on a transmission path of the first IPv6 measurement request packet to include bit error information of at least one intermediate node on the transmission path in a measurement response packet, and the at least one intermediate node includes the first intermediate node.

The second indication information mentioned herein may correspond to the indication information 2 in the method 100.

In an implementation, a payload of the first IPv6 measurement request packet includes the second indication information.

In an implementation, the first IPv6 measurement request packet includes:

a STAMP request packet or an IPv6 ping request packet.

Figure 5:
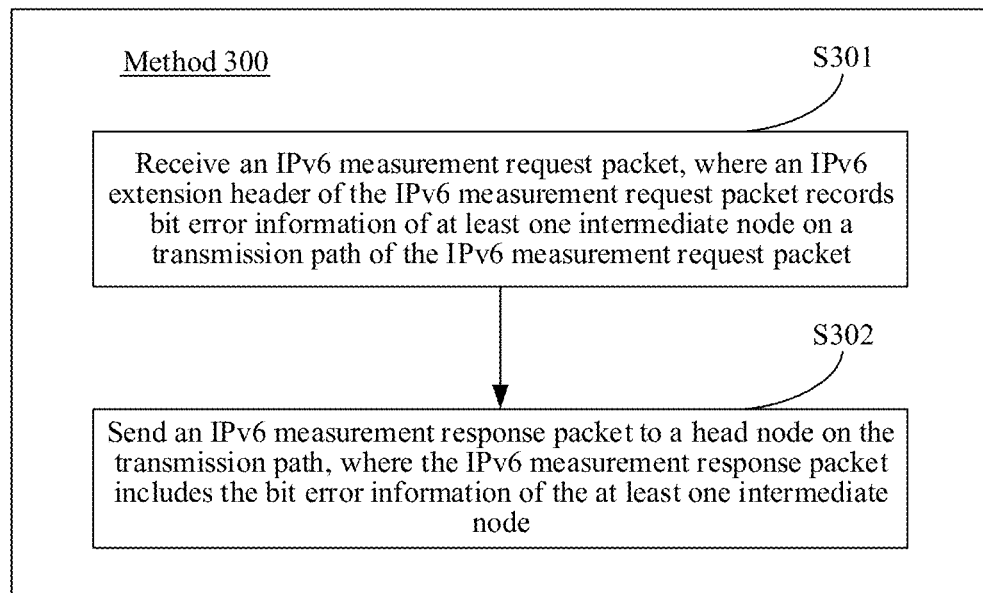
FIG. 5 is a schematic flowchart of a method for collecting bit error information according to an embodiment of this application.

Embodiments of this application further provide a method for collecting bit error information. FIG. 5 is a schematic flowchart of a method for collecting bit error information according to an embodiment of this application. A method 300 for collecting bit error information shown in FIG. 5 may be performed by a tail node on a transmission path. The tail node may correspond to the node corresponding to the communication apparatus 3 in the foregoing method 100. In other words, when the method 300 is applied to the foregoing method 100, the method 300 may correspond to the steps performed by the communication apparatus 3 in the foregoing method 100. The method 300 may include, for example, the following S301 and S302.

S301: Receive an IPv6 measurement request packet, where an IPv6 extension header of the IPv6 measurement request packet records bit error information of at least one intermediate node on a transmission path of the IPv6 measurement request packet.

S302: Send an IPv6 measurement response packet to a head node on the transmission path, where the IPv6 measurement response packet includes the bit error information of the at least one intermediate node.

The IPv6 measurement request packet mentioned herein may correspond to the packet 1 that is received by the communication apparatus 3 in the foregoing method 100 and that records the bit error information of the intermediate node corresponding to the communication apparatus 2. The IPv6 measurement response packet mentioned herein may correspond to the packet 2 in the foregoing method 100.

In an implementation, a payload of the IPv6 measurement response packet includes the bit error information of the at least one intermediate node.

In an implementation, the payload includes a first type-length-value TLV field, and the first TLV field includes the bit error information of the at least one intermediate node.

The first TLV field mentioned herein may correspond to the extended TLV field in the STAMP response packet in the foregoing method 100, or may correspond to the extended TLV field in the ping response packet in the foregoing method 100.

In an implementation, the IPv6 measurement request packet includes a STAMP request packet, and the IPv6 measurement response packet includes a STAMP response packet, or the IPv6 measurement request packet includes an IPv6 ping request packet, and the IPv6 measurement response packet includes an IPv6 ping response packet.

In an implementation, the IPv6 extension header of the IPv6 measurement request packet includes a second TLV field, and the second TLV field records the bit error information of the at least one intermediate node.

The second TLV field mentioned herein may correspond to the TLV field 1 in the foregoing method 100.

In an implementation, the IPv6 measurement request packet is an SRv6 measurement request packet.

In an implementation, the IPv6 measurement request packet includes indication information, and the indication information indicates a tail node on the transmission path to include the bit error information of the at least one intermediate node in the measurement response packet.

The indication information mentioned herein may correspond to the indication information 2 in the foregoing method 100.

In an implementation, a payload of the IPv6 measurement request packet includes the indication information.

In an implementation, the IPv6 measurement response packet further includes bit error information of the tail node on the transmission path.

The tail node on the transmission path mentioned herein may correspond to the node corresponding to the communication apparatus 2 in the foregoing method 100.

Figure 6:
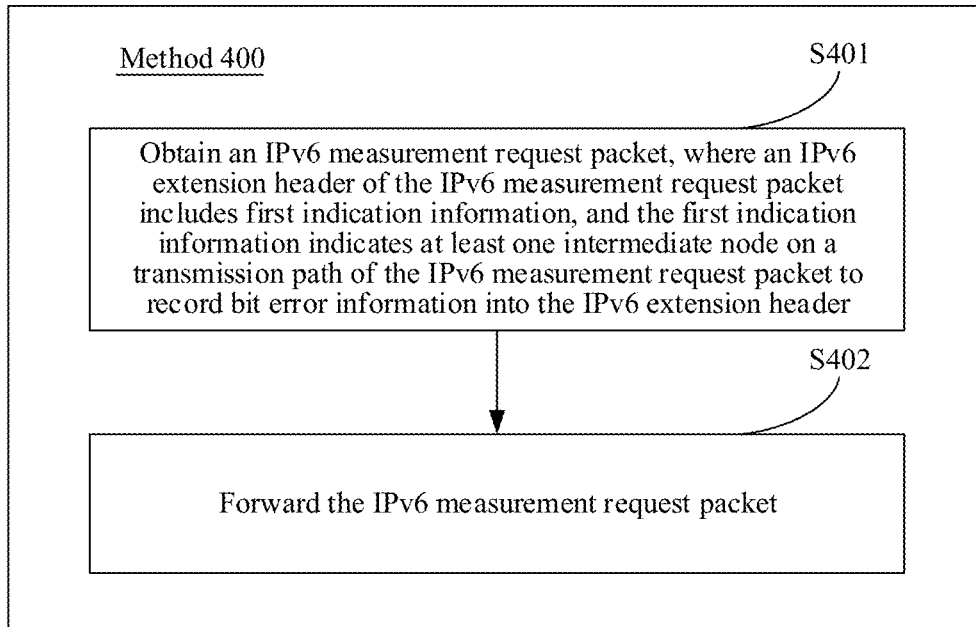
FIG. 6 is a schematic flowchart of a method for collecting bit error information according to an embodiment of this application.

Embodiments of this application further provide a method for collecting bit error information. FIG. 6 is a schematic flowchart of a method for collecting bit error information according to an embodiment of this application. The method 400 for collecting bit error information shown in FIG. 6 may be executed by a head node or a first intermediate node on a transmission path. The head node may correspond to the node corresponding to the communication apparatus 1 in the foregoing method 100, and the first intermediate node may correspond to the node corresponding to the communication apparatus 2 in the foregoing method 100. In other words, when the method 400 is applied to the foregoing method 100, the method 400 may correspond to the steps performed by the communication apparatus 1 or the communication apparatus 2 in the foregoing method 100. The method 400 may include, for example, the following S401 and S402.

S401: Obtain an IPv6 measurement request packet, where an IPv6 extension header of the IPv6 measurement request packet includes first indication information, and the first indication information indicates at least one intermediate node on a transmission path of the IPv6 measurement request packet to record bit error information into the IPv6 extension header.

S402: Forward the IPv6 measurement request packet.

When the method 400 is performed by the head node on the transmission path, the IPv6 measurement request packet mentioned herein may correspond to the packet 1 sent by the communication apparatus 1 in the method 100, and the first indication information mentioned herein may correspond to the indication information 1 in the method 100.

When the method 400 is performed by the intermediate node on the transmission path, the IPv6 measurement request packet mentioned herein may correspond to the packet 1 received by the communication apparatus 2 in the method 100, and the first indication information mentioned herein may correspond to the indication information 1 in the method 100.

In an implementation, the IPv6 extension header includes first indication information, and the first indication information indicates the first intermediate node to record the bit error information into the first IPv6 measurement request packet.

In an implementation, the IPv6 extension header includes a first type-length-value TLV field, and the first TLV field includes the first indication information.

The first TLV field mentioned herein may correspond to the TLV field 1 in the method 100.

In an implementation, a type field of the first TLV field includes the first indication information, and a value field of the first TLV field records the bit error information of the at least one intermediate node.

In an implementation, the IPv6 measurement request packet is an SRv6 measurement request packet.

In an implementation, a segment identifier SID of the at least one intermediate node records the bit error information of the at least one intermediate node. In this case, the IPv6 extension header carrying the first indication information is an SRH.

In an implementation, an argument field of the segment identifier SID of the at least one intermediate node records the bit error information of the at least one intermediate node.

In an implementation, the IPv6 extension header is a hop-by-hop HBH option header.

In an implementation, the IPv6 extension header is a destination option header DOH.

For specific implementations of the method 200, the method 300, and the method 400, refer to related descriptions of the method 100. Details are not described herein.

Figure 7:
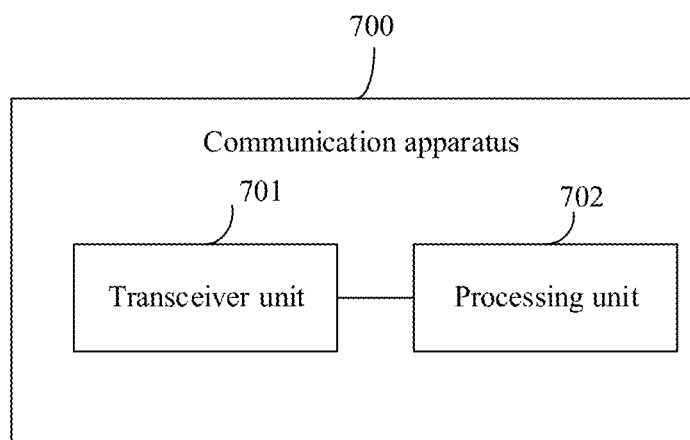
FIG. 7 is a schematic diagram of a structure of a communication apparatus according to an embodiment of this application.

In addition, embodiments of this application further provide a communication apparatus 700, as shown in FIG. 7. FIG. 7 is a schematic diagram of a structure of a communication apparatus according to an embodiment of this application. The communication apparatus 700 includes a transceiver unit 701 and a processing unit 702. The communication apparatus 700 may be configured to perform the method 100, the method 200, the method 300, or the method 400 in the foregoing embodiments.

In an example, the communication apparatus 700 may perform the method 100 in the foregoing embodiment. When the communication apparatus 700 is configured to perform the method 100 in the foregoing embodiment, the communication apparatus 700 is equivalent to the communication apparatus 1 in the method 100. The transceiver unit 701 is configured to perform sending and receiving operations performed by the communication apparatus 1 in the method 100. The processing unit 702 is configured to perform an operation performed by the communication apparatus 1 in the method 100 other than the sending and receiving operations. For example, the processing unit 702 is configured to generate a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The transceiver unit 701 is configured to send the packet 1 to the communication apparatus 2.

In an example, the communication apparatus 700 may perform the method 100 in the foregoing embodiment. When the communication apparatus 700 is configured to perform the method 100 in the foregoing embodiment, the communication apparatus 700 is equivalent to the communication apparatus 2 in the method 100. The transceiver unit 701 is configured to perform sending and receiving operations performed by the communication apparatus 2 in the method 100. The processing unit 702 is configured to perform an operation performed by the communication apparatus 2 in the method 100 other than the sending and receiving operations. For example, the transceiver unit 701 is configured to receive a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The processing unit 702 is configured to record bit error information of an intermediate node corresponding to the communication apparatus 2 into the packet 1.

In an example, the communication apparatus 700 may perform the method 100 in the foregoing embodiment. When the communication apparatus 700 is configured to perform the method 100 in the foregoing embodiment, the communication apparatus 700 is equivalent to the communication apparatus 3 in the method 100. The transceiver unit 701 is configured to perform sending and receiving operations performed by the communication apparatus 3 in the method 100. The processing unit 702 is configured to perform an operation performed by the communication apparatus 3 in the method 100 other than the sending and receiving operations. For example, the transceiver unit 701 is configured to receive the packet 1 recording the bit error information of the intermediate node corresponding to the communication apparatus 2. The processing unit 702 is configured to generate a packet 2, where the packet 2 includes the bit error information carried in the packet 1 received by the communication apparatus 3. The transceiver unit 701 is further configured to send the packet 2 to the communication apparatus 1.

In an example, the communication apparatus 700 may perform the method 200 in the foregoing embodiment. When the communication apparatus 700 is configured to perform the method 200 in the foregoing embodiment, the transceiver unit 701 is configured to perform sending and receiving operations in the method 200. The processing unit 702 is configured to perform an operation in the method 200 other than the sending and receiving operations. For example, the transceiver unit 701 is configured to receive a first IPv6 measurement request packet. The processing unit 702 is configured to record bit error information of a first intermediate node into an IPv6 extension header of the first IPv6 measurement request packet, to obtain a second IPv6 measurement request packet. The transceiver unit 701 is further configured to forward the second IPv6 measurement request packet.

In an example, the communication apparatus 700 may perform the method 300 in the foregoing embodiment. When the communication apparatus 700 is configured to perform the method 300 in the foregoing embodiment, the transceiver unit 701 is configured to perform sending and receiving operations in the method 300. The processing unit 702 is configured to perform an operation in the method 300 other than the sending and receiving operations. For example, the transceiver unit 701 is configured to receive an IPv6 measurement request packet, where an IPv6 extension header of the IPv6 measurement request packet records bit error information of at least one intermediate node on a transmission path of the IPv6 measurement request packet. The processing unit 702 is configured to obtain an IPv6 measurement response packet, where the IPv6 measurement response packet includes the bit error information of the at least one intermediate node. The transceiver unit 701 is further configured to send the IPv6 measurement response packet to the head node on the transmission path.

In an example, the communication apparatus 700 may perform the method 400 in the foregoing embodiment. When the communication apparatus 700 is configured to perform the method 400 in the foregoing embodiment, the transceiver unit 701 is configured to perform sending and receiving operations in the method 400. The processing unit 702 is configured to perform an operation in the method 400 other than the sending and receiving operations. For example, the processing unit 702 is configured to obtain an IPv6 measurement request packet, where an IPv6 extension header of the IPv6 measurement request packet includes first indication information, and the first indication information indicates at least one intermediate node on a transmission path of the IPv6 measurement request packet to record bit error information into the IPv6 extension header. The transceiver unit 701 is configured to forward the IPv6 measurement request packet.

Figure 8:
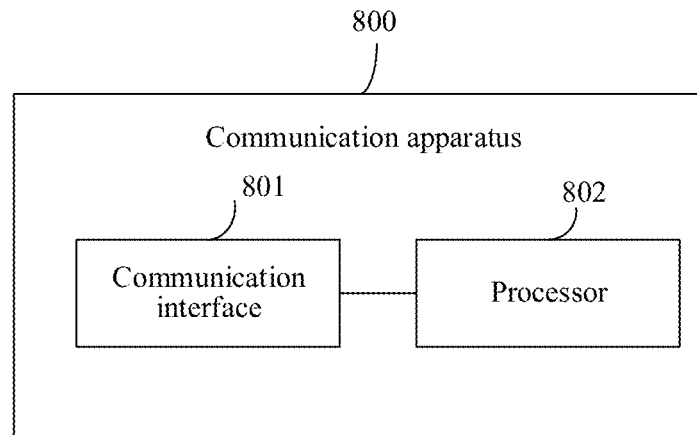
FIG. 8 is a schematic diagram of a structure of a communication apparatus according to an embodiment of this application.

In addition, embodiments of this application further provide a communication apparatus 800, as shown in FIG. 8. FIG. 8 is a schematic diagram of a structure of a communication apparatus according to an embodiment of this application. The communication apparatus 800 includes a communication interface 801 and a processor 802 connected to the communication interface 801. The communication apparatus 800 may be configured to perform the method 100, the method 200, the method 300, or the method 400 in the foregoing embodiments.

In an example, the communication apparatus 800 may perform the method 100 in the foregoing embodiment. When the communication apparatus 800 is configured to perform the method 100 in the foregoing embodiment, the communication apparatus 800 is equivalent to the communication apparatus 1 in the method 100. The communication interface 801 is configured to sending and receiving operations performed by the communication apparatus 1 in the method 100. The processor 802 is configured to perform an operation performed by the communication apparatus 1 in the method 100 other than the sending and receiving operations. For example, the processor 802 is configured to generate a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The communication interface 801 is configured to send the packet 1 to the communication apparatus 2.

In an example, the communication apparatus 800 may perform the method 100 in the foregoing embodiment. When the communication apparatus 800 is configured to perform the method 100 in the foregoing embodiment, the communication apparatus 800 is equivalent to the communication apparatus 2 in the method 100. The communication interface 801 is configured to sending and receiving operations performed by the communication apparatus 2 in the method 100. The processor 802 is configured to perform an operation performed by the communication apparatus 2 in the method 100 other than the sending and receiving operations. For example, the communication interface 801 is configured to receive a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The processor 802 is configured to record bit error information of an intermediate node corresponding to the communication apparatus 2 into the packet 1.

In an example, the communication apparatus 800 may perform the method 100 in the foregoing embodiment. When the communication apparatus 800 is configured to perform the method 100 in the foregoing embodiment, the communication apparatus 800 is equivalent to the communication apparatus 3 in the method 100. The communication interface 801 is configured to sending and receiving operations performed by the communication apparatus 3 in the method 100. The processor 802 is configured to perform an operation performed by the communication apparatus 3 in the method 100 other than the sending and receiving operations. For example, the communication interface 801 is configured to receive the packet 1 recording the bit error information of the intermediate node corresponding to the communication apparatus 2. The processor 802 is configured to generate a packet 2, where the packet 2 includes the bit error information carried in the packet 1 received by the communication apparatus 3. The transceiver unit is further configured to send the packet 2 to the communication apparatus 1.

In an example, the communication apparatus 800 may perform the method 200 in the foregoing embodiment. When the communication apparatus 800 is configured to perform the method 200 in the foregoing embodiment, the communication interface 801 is configured to perform sending and receiving operations in the method 200. The processor 802 is configured to perform an operation in the method 200 other than the sending and receiving operations. For example, the communication interface 801 is configured to receive a first IPv6 measurement request packet. The processor 802 is configured to record bit error information of a first intermediate node into an IPv6 extension header of the first IPv6 measurement request packet, to obtain a second IPv6 measurement request packet. The communication interface 801 is further configured to forward the second IPv6 measurement request packet.

In an example, the communication apparatus 800 may perform the method 300 in the foregoing embodiment. When the communication apparatus 800 is configured to perform the method 300 in the foregoing embodiment, the communication interface 801 is configured to perform sending and receiving operations in the method 300. The processor 802 is configured to perform an operation in the method 300 other than the sending and receiving operations. For example, the communication interface 801 is configured to receive an IPv6 measurement request packet, where an IPv6 extension header of the IPv6 measurement request packet records bit error information of at least one intermediate node on a transmission path of the IPv6 measurement request packet. The processor 802 is configured to obtain an IPv6 measurement response packet, where the IPv6 measurement response packet includes the bit error information of the at least one intermediate node. The communication interface 801 is further configured to send the IPv6 measurement response packet to the head node on the transmission path.

In an example, the communication apparatus 800 may perform the method 400 in the foregoing embodiment. When the communication apparatus 800 is configured to perform the method 400 in the foregoing embodiment, the communication interface 801 is configured to perform sending and receiving operations in the method 400. The processor 802 is configured to perform an operation in the method 400 other than the sending and receiving operations. For example, the processor 802 is configured to obtain an IPv6 measurement request packet, where an IPv6 extension header of the IPv6 measurement request packet includes first indication information, and the first indication information indicates at least one intermediate node on a transmission path of the IPv6 measurement request packet to record bit error information into the IPv6 extension header. The communication interface 801 is configured to forward the IPv6 measurement request packet.

Figure 9:
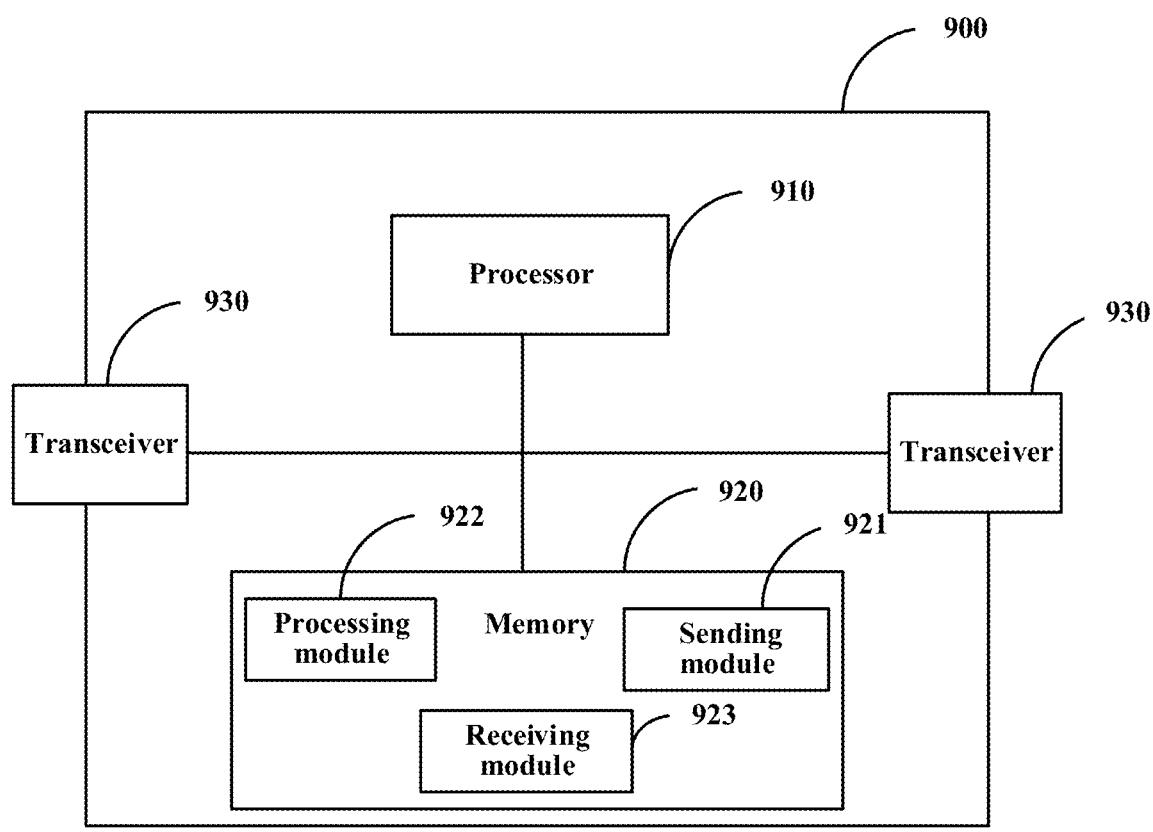
FIG. 9 is a schematic diagram of a structure of a communication apparatus according to an embodiment of this application.

In addition, embodiments of this application further provide a communication apparatus 900. FIG. 9 is a schematic diagram of a structure of a communication apparatus according to an embodiment of this application.

The communication apparatus 900 may be configured to perform the method 100, the method 200, the method 300, or the method 400 in the foregoing embodiments.

As shown in FIG. 9, the communication apparatus 900 includes a processor 910 and a memory 920 and a transceiver 930 that are coupled to the processor 910. The transceiver 930 may be, for example, a communication interface, an optical module, or the like. The processor 910 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 910 may be one processor, or may include a plurality of processors. The memory 920 may be a volatile memory such as a random access memory (RAM), or may be a non-volatile memory such as a read-only memory (ROM), a flash memory, a hard disk drive (HDD), or a solid-state drive (SSD), or may be a combination of the foregoing types of memories. The memory 920 may be one memory, or may include a plurality of memories. In an implementation, the memory 920 stores computer-readable instructions. The computer-readable instructions may include a plurality of software modules, for example, a sending module 921, a processing module 922, and a receiving module 923. After executing each software module, the processor 910 may perform a corresponding operation based on the indication of each software module. In this embodiment, an operation performed by one software module is actually an operation performed by the processor 910 based on the indication of the software module.

In an example, the communication apparatus 900 may perform the method 100 in the foregoing embodiment. When the communication apparatus 900 is configured to perform the method 100 in the foregoing embodiment, the communication apparatus 900 is equivalent to the communication apparatus 1 in the method 100. The transceiver 930 is configured to perform sending and receiving operations performed by the communication apparatus 1 in the method 100. The processor 910 is configured to perform an operation performed by the communication apparatus 1 in the method 100 other than the sending and receiving operations. For example, the processor 910 is configured to generate a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The transceiver 930 is configured to send the packet 1 to the communication apparatus 2.

In an example, the communication apparatus 900 may perform the method 100 in the foregoing embodiment. When the communication apparatus 900 is configured to perform the method 100 in the foregoing embodiment, the communication apparatus 900 is equivalent to the communication apparatus 2 in the method 100. The transceiver 930 is configured to perform sending and receiving operations performed by the communication apparatus 2 in the method 100. The processor 910 is configured to perform an operation performed by the communication apparatus 2 in the method 100 other than the sending and receiving operations. For example, the transceiver 930 is configured to receive a packet 1, where the packet 1 is a measurement request packet, the packet 1 is an IPv6 packet, an IPv6 extension header of the packet 1 includes indication information 1, and the indication information 1 indicates at least one intermediate node on a transmission path of the packet 1 to record bit error information into the IPv6 extension header of the packet 1. The processor 910 is configured to record bit error information of an intermediate node corresponding to the communication apparatus 2 into the packet 1.

In an example, the communication apparatus 900 may perform the method 100 in the foregoing embodiment. When the communication apparatus 900 is configured to perform the method 100 in the foregoing embodiment, the communication apparatus 900 is equivalent to the communication apparatus 3 in the method 100. The transceiver 930 is configured to perform sending and receiving operations performed by the communication apparatus 3 in the method 100. The processor 910 is configured to perform an operation performed by the communication apparatus 3 in the method 100 other than the sending and receiving operations. For example, the transceiver 930 is configured to receive the packet 1 recording the bit error information of the intermediate node corresponding to the communication apparatus 2. The processor 910 is configured to generate a packet 2, where the packet 2 includes the bit error information carried in the packet 1 received by the communication apparatus 3. The transceiver unit is further configured to send the packet 2 to the communication apparatus 1.

In an example, the communication apparatus 900 may perform the method 200 in the foregoing embodiment. When the communication apparatus 900 is configured to perform the method 200 in the foregoing embodiment, the transceiver 930 is configured to perform sending and receiving operations in the method 200. The processor 910 is configured to perform an operation in the method 200 other than the sending and receiving operations. For example, the transceiver 930 is configured to receive a first IPv6 measurement request packet. The processor 910 is configured to record bit error information of a first intermediate node into an IPv6 extension header of the first IPv6 measurement request packet, to obtain a second IPv6 measurement request packet. The transceiver 930 is further configured to forward the second IPv6 measurement request packet.

In an example, the communication apparatus 900 may perform the method 300 in the foregoing embodiment. When the communication apparatus 900 is configured to perform the method 300 in the foregoing embodiment, the transceiver 930 is configured to perform sending and receiving operations in the method 300. The processor 910 is configured to perform an operation in the method 300 other than the sending and receiving operations. For example, the transceiver 930 is configured to receive an IPv6 measurement request packet, where an IPv6 extension header of the IPv6 measurement request packet records bit error information of at least one intermediate node on a transmission path of the IPv6 measurement request packet. The processor 910 is configured to obtain an IPv6 measurement response packet, where the IPv6 measurement response packet includes the bit error information of the at least one intermediate node. The transceiver 930 is further configured to send the IPv6 measurement response packet to the head node on the transmission path.

In an example, the communication apparatus 900 may perform the method 400 in the foregoing embodiment. When the communication apparatus 900 is configured to perform the method 400 in the foregoing embodiment, the transceiver 930 is configured to perform sending and receiving operations in the method 400. The processor 910 is configured to perform an operation in the method 400 other than the sending and receiving operations. For example, the processor 910 is configured to obtain an IPv6 measurement request packet, where an IPv6 extension header of the IPv6 measurement request packet includes first indication information, and the first indication information indicates at least one intermediate node on a transmission path of the IPv6 measurement request packet to record bit error information into the IPv6 extension header. The transceiver 930 is configured to forward the IPv6 measurement request packet.

This application further provides a computer-readable storage medium. The computer-readable storage medium stores instructions. When the instructions are run on a computer, the computer is enabled to perform any one or more operations in the method (for example, the method 100, the method 200, the method 300, and the method 400) according to any one of the foregoing embodiments.

This application further provides a computer program product, including a computer program. When the computer program is run on a computer, the computer is enabled to perform any one or more operations in the method (for example, the method 100, the method 200, the method 300, and the method 400) according to any one of the foregoing embodiments.

This application further provides a communication system, including at least two of the communication apparatus 1, the communication apparatus 2, and the communication apparatus 3 that are mentioned in the foregoing embodiments. For example, the communication system includes the communication apparatus 1 and the communication apparatus 2. For another example, the communication system includes the communication apparatus 2 and the communication apparatus 3. For still another example, the communication system includes the communication apparatus 1 and the communication apparatus 3. For yet another example, the communication system includes the communication apparatus 1, the communication apparatus 2, and the communication apparatus 3.

This application further provides a communication system, including at least one memory and at least one processor. The at least one memory stores instructions. The at least one processor executes the instructions, to enable the communication system to perform any one or more operations in the method (for example, the method 100, the method 200, the method 300, and the method 400) according to any one of the foregoing embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

A person skilled in the art should be aware that in the foregoing one or more examples, services described in the present invention may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific implementations. It can be understood that the foregoing descriptions are merely specific implementations of the present invention.

The foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication apparatus, comprising:
a memory; and
one or more processors,
wherein the memory is configured to store program code, and
the one or more processors are configured to execute instructions in the program code, to enable the communication apparatus to:
receive a first Internet Protocol version 6 (IPv6) measurement request packet, wherein the first IPv6 measurement request packet includes second indication information, the second indication information indicates a tail node on a transmission path of the first IPv6 measurement request packet to include bit error information of at least one intermediate node on the transmission path in a measurement response packet, and the at least one intermediate node comprises a first intermediate node;
record bit error information of the first intermediate node into an IPv6 extension header of the first IPv6 measurement request packet, to obtain a second IPv6 measurement request packet; and
forward the second IPv6 measurement request packet.

2. The communication apparatus according to claim 1, wherein the first IPv6 measurement request packet further comprises bit error information of a second intermediate node, and the second intermediate node is an upstream node of the first intermediate node.

3. The communication apparatus according to claim 1, wherein the IPv6 extension header comprises first indication information, and the first indication information indicates the first intermediate node to record the bit error information into the first IPv6 measurement request packet.

4. The communication apparatus according to claim 3, wherein the IPv6 extension header comprises a first type-length-value (TLV) field, and the first TLV field comprises the first indication information.

5. He communication apparatus according to claim 4, wherein a type field of the first TLV field comprises the first indication information, and a value field of the first TLV field records the bit error information of the first intermediate node.

6. The communication apparatus according to claim 1, wherein the first IPv6 measurement request packet and the second IPv6 measurement request packet are segment routing Internet Protocol version 6 (SRv6) measurement request packets.

7. The communication apparatus according to claim 6, wherein a segment identifier (SID) of the first intermediate node records the bit error information of the first intermediate node.

8. The communication apparatus according to claim 7, wherein an arguments field of the SID records the bit error information of the first intermediate node.

9. The communication apparatus according to claim 1, wherein the IPv6 extension header is a hop-by-hop (HBH) option header.

10. The communication apparatus according to claim 6, wherein the IPv6 extension header is a destination option header (DOH).

11. The communication apparatus according to claim 1, wherein a payload of the first IPv6 measurement request packet comprises the second indication information.

12. The communication apparatus according to claim 1, wherein the first IPv6 measurement request packet comprises:
a simple two-way active measurement protocol (STAMP) request packet or an IPv6 ping request packet.

13. A communication apparatus, comprising:
a memory; and
one or more processors,
wherein the memory is configured to store program code, and
the one or more processors are configured to execute instructions in the program code, to enable the communication apparatus to:
receive an Internet Protocol version 6 (IPv6) measurement request packet, wherein an IPv6 extension header of the IPv6 measurement request packet records bit error information of at least one intermediate node on a transmission path of the IPv6 measurement request packet, and wherein the IPv6 measurement request packet includes an indication information that indicates the communication apparatus to include the bit error information of the at least one intermediate node on the transmission path in an IPv6 measurement response packet; and
send the IPv6 measurement response packet to a head node on the transmission path, wherein the IPv6 measurement response packet comprises the bit error information of the at least one intermediate node.

14. The communication apparatus according to claim 1, wherein the first IPv6 measurement request packet comprises a simple two-way active measurement protocol (STAMP) request packet, and the measurement response packet comprises a STAMP response packet; or
the first IPv6 measurement request packet comprises an IPv6 ping request packet, and the measurement response packet comprises an IPv6 ping response packet.

15. The communication apparatus according to claim 13, wherein a payload of the IPv6 measurement response packet comprises the bit error information of the at least one intermediate node.

16. The communication apparatus according to claim 15, wherein the payload comprises a first type-length-value (TLV) field, and the first TLV field comprises the bit error information of the at least one intermediate node.

17. The communication apparatus according to claim 13, wherein
the IPv6 measurement request packet comprises a simple two-way active measurement protocol (STAMP) request packet, and the IPv6 measurement response packet comprises a STAMP response packet; or the IPv6 measurement request packet comprises an IPv6 ping request packet, and the IPv6 measurement response packet comprises an IPv6 ping response packet.

18. The communication apparatus according to claim 13, wherein the IPv6 extension header of the IPv6 measurement request packet comprises a second TLV field, and the second TLV field records the bit error information of the at least one intermediate node.

19. The communication apparatus according to claim 13, wherein the IPv6 measurement request packet is a segment routing Internet Protocol version 6 (SRv6) measurement request packet.

20. A communication apparatus, comprising:
a memory; and
one or more processors,
wherein the memory is configured to store program code, and
the one or more processors are configured to execute instructions in the program code, to enable the communication apparatus to:

obtain an Internet Protocol version 6 (IPv6) measurement request packet, wherein an IPv6 extension header of the IPv6 measurement request packet includes first indication information, and the first indication information indicates at least one intermediate node on a transmission path of the IPv6 measurement request packet to record bit error information into the IPv6 extension header, and wherein the IPv6 measurement request packet includes second indication information, the second indication information indicates a tail node on a transmission path of the IPv6 measurement request packet to include the bit error information of the at least one intermediate node on the transmission path in a measurement response packet; and forward the IPv6 measurement request packet.

21. The communication apparatus according to claim 20, wherein the second indication information is the first indication information.

\* \* \* \* \*